(12) United States Patent
Corbo (10) Patent No.: US 11,643,119 B2
(45) Date of Patent: May 9, 2023

(54) TRACK CIRCUIT SURGE PROTECTION

(71) Applicant: Siemens Mobility, Inc., New York, NY (US)

(72) Inventor: Mark Corbo, Prospect, KY (US)

(73) Assignee: Siemens Mobility, Inc., New York, NY (US)

( * ) Notice: Subject to any disclaimer, the term of this patent is extended or adjusted under 35 U.S.C. 154(b) by 262 days.

(21) Appl. No.: 17/051,284

(22) PCT Filed: May 21, 2019

(86) PCT No.: PCT/US2019/033287
§ 371 (c)(1),
(2) Date: Oct. 28, 2020

(87) PCT Pub. No.: WO2019/231759
PCT Pub. Date: Dec. 5, 2019

(65) Prior Publication Data
US 2021/0237783 A1      Aug. 5, 2021

Related U.S. Application Data

(60) Provisional application No. 62/677,687, filed on May 30, 2018.

(51) Int. Cl.
*H02H 9/04*    (2006.01)
*B61L 1/20*    (2006.01)
*B61L 1/18*    (2006.01)

(52) U.S. Cl.
CPC    *B61L 1/20* (2013.01); *B61L 1/18* (2013.01); *H02H 9/044* (2013.01); *H02H 9/045* (2013.01);

(Continued)

(58) Field of Classification Search
CPC .......... B61L 1/20; H02H 9/041; H02H 9/042; H02H 9/043
See application file for complete search history.

(56) References Cited

U.S. PATENT DOCUMENTS 3,423,635 A * 1/1969 Moe ................ H02H 9/041
361/117
5,001,587 A * 3/1991 Clark ................ B61L 1/20
361/126

(Continued)

OTHER PUBLICATIONS

PCT International Search Report and Written Opinion of International Searching Authority dated Aug. 16, 2019 corresponding to PCT International Application No. PCT/US2019/033287 filed May 21, 2019.

*Primary Examiner* — Gary A Nash (57) ABSTRACT

A surge suppression circuit for a track circuit is provided. The surge suppression circuit comprises a first surge protection device including a first pair of silicon avalanche diodes and a second surge protection device including a second pair of silicon avalanche diodes. The first surge protection device is connected on a first connection line between a first terminal of a railroad signaling electronic equipment to be protected from a surge and a first terminal of a first rail of two physical rails. The second surge protection device is connected on a second connection line between a second terminal of the railroad signaling electronic equipment and a second terminal of a second rail of the two physical rails. The first surge protection device and the second surge protection device are connected to an earth ground terminal.

18 Claims, 5 Drawing Sheets

(52) U.S. Cl.
CPC ............ *H02H 9/041* (2013.01); *H02H 9/042* (2013.01); *H02H 9/043* (2013.01)

(56) References Cited

U.S. PATENT DOCUMENTS

| | | | | |
|---|---|---|---|---|
| 5,222,010 | A * | 6/1993 | Capan ................... | H02H 9/005 361/111 |
| 8,717,726 | B2 * | 5/2014 | de Palma ............... | H02H 9/041 361/91.5 |
| 2012/0250205 | A1 * | 10/2012 | Pfitzer ................... | H02H 9/041 361/91.1 |
| 2013/0208387 | A1 * | 8/2013 | Nguyen ................. | H02H 9/042 361/118 |
| 2013/0321963 | A1 * | 12/2013 | Lai ........................ | H02H 9/041 361/56 |

* cited by examiner

Provide a first surge protection device including a first pair of silicon avalanche diodes for providing a surge suppression in a track circuit

810

Provide a second surge protection device including a second pair of silicon avalanche diodes, wherein the first surge protection device is connected on a first connection line between a first terminal of a railroad signaling electronic equipment to be protected from a surge and a first terminal of a first track of two physical rails, wherein the second surge protection device is connected on a second connection line between a second terminal of the railroad signaling electronic equipment and a second terminal of a second track of the two physical rails, and wherein the first surge protection device and the second surge protection device are connected to a ground terminal

TRACK CIRCUIT SURGE PROTECTION

BACKGROUND

1. Field

Aspects of the present invention generally relate to surge protection of a track circuit. Specifically, the present disclosure relates to an improved technology for track circuit surge protection, applicable for example to grade crossing predictor (GCP) territory.

2. Description of the Related Art

The application of railroad signal wayside and crossing equipment necessitates that it is installed adjacent to the rails themselves. In fact, there is an electrical connection to the rails to facilitate signal transfer in most situations. This situation covers a great number of different systems.

Frequently the case, houses and appliances associated with the equipment are the highest/tallest metal objects located in that area. Additionally, the rails themselves are grounded (earthed) as are the afore mentioned cases, houses, and appliances. Exposure to surges is from two sources: lightning and man-made.

Because of the distributed railroad environment and these specific factors: tallest objects in area and connected to ground (earth) make the railroad signal equipment a frequent target of lightning surges discharging to the ground. The lightning surges can be several million volts and thousands of amps which have the potential to catastrophically damage the rail signal equipment. There is only one other industry with similar exposure-aircraft.

Man-made surges are a result of "Power Transmission" problems and faults. Although they do not contain the same peak energy these situations are more frequent and have a much longer duration than lightning type events.

Understanding this; the industry established a methodology unique to the exposure conditions (much different than communications) to protect/shield the rail signal equipment from damage by the lightning surges and at the same time offer at least some protection from the Power Fault events. The techniques of shielding for tall structures and cables and suppression for the electromechanical and electronic equipment were the investigated methodologies. Shielding uses ground grids, grounded wires and plates to allow the surge to conduct away from the protected wire. While the shielding process prevents some level of damage (especially power related) more was required in the suppression arena. The first devices designed for surge suppression were air gap arrestors. Since the early equipment was relay/motor-based technology "air gap" devices were used initially to protect this equipment from surges.

Air Gap arrestors are constructed with two plates separated by several thousandth's of an inch (the air gap). When the surge event happens, the charge ionizes the air in the gap space. This ionized air passes the surge current from on contact point to the other. Because on side is typically tied to earth ground this allows the surge current to flow to earth rather than through the protected equipment.

The "air gap" devices are very robust and reliable as a source of protection for the relay/motor devices and electronics. They were first used in the 1930's and were designed by a Siemens predecessor company and are still in use today.

In order to understand the performance of the arrestor one needs to consider the surge environment they must protect against. Although as previously mentioned the initial surge event can be millions of volts and thousands of amps. By the time the surge reaches the equipment to be protected this has decreased to several thousand volts and several thousand amps. The decrease is due to resistance in the air and conductors in the railroad system. Although values can be higher a surge event is characterized by less than 50,000 amps and most frequently in the 20,000 amp area. For a 20 Ka waveform (8×20-ANSI/I.E.E.E.) the "gap" device will limit the voltage about 1,200 and current to 3,000 amps in about 1 ms time.

As such the "Air Gap" device was perfect for motors and relays, but not quite adequate for pure electronic circuits which can be damaged by less than 100 volts, and in less time than an air gap provides protection.

Further studies were conducted in order to identify improved surge mitigation. This led to a layered protection technique which is still used today (See AREMA Section 11). In addition to improved shielding techniques this technique typically has used "Air Gaps" as primary (High Level), Inductors, capacitors, and gas tube type devices as secondary (Mid Level), and solid state diodes, capacitors, resettable fuses as tertiary level (Low Level).

Even with the layered methodology however the protection afforded was not completely reliable with today's microelectronics. As such changes have been made along the way to improve the protection. Essentially these changes have involved solid state technology: Mov's, diodes, and gas tubes. Each of these devices is effectively an open circuit under ambient conditions. As surge voltage builds the devices begin to conduct current until it reaches a short circuit state (quantum physics) and limits the surge voltage and current. Typically, the voltage limit is a few hundred volts and current similar values. This process occurs in micro seconds so it limits the surge event much faster than the Air Gap device.

While each of these has offered improvements there have always been limitations in amplitude handling ability and also concerns about failure modes. The layered technique is still applied with the solid-state devices. That has limited the application of the new technologies and in fact "Air Gaps" even with limitations are still popular.

Recent new surge arresting products introduced in the rail industry include improved gas tubes, MOV Gas Tube combinations and Zener diodes. Each of these devices offer better performance than air gaps both in voltage clamping and current shunting to earth ground. These devices have provided enhanced protection when used in the conventional 3 device application—Line to Line and each line to earth ground. Although these devices are much faster to clamp there is still an overriding concern about failure modes and using these devices in track circuit applications.

Therefore, there is a need for providing a better surge suppression in a track circuit.

SUMMARY

Briefly described, aspects of the present invention relate to a surge suppression in a track circuit using a diode-based technology, i.e., "silicon avalanche diodes (SADs)". Recent advancements of this technology have become available which allow the proposed changes in the layered methodology. The advantage of this technology is the speed in which it limits the surge. Initially this technology was applied with MOV's when used as a primary device. While this provided an improved protection level there was still "Failure Mode" concerns when applied to track circuits. For this reason, they were used in limited applications. This technology shows not only significant improvements in voltage and current limiting, but also because of construction minimizes the "Failure Mode" concerns as well. The key to this is the multilayered construction of the SAD device.

In accordance with one illustrative embodiment of the present invention, a surge suppression circuit for a track circuit is provided. The surge suppression circuit comprises a first surge protection device including a first pair of silicon avalanche diodes and a second surge protection device including a second pair of silicon avalanche diodes. The first surge protection device is connected on a first connection line between a first terminal of a railroad signaling electronic equipment to be protected from a surge and a first terminal of a first rail of two physical rails. The second surge protection device is connected on a second connection line between a second terminal of the railroad signaling electronic equipment and a second terminal of a second rail of the two physical rails. The first surge protection device and the second surge protection device are connected to an earth ground terminal.

In accordance with another illustrative embodiment of the present invention, a method of providing a surge suppression in a track circuit. The method comprises providing a first surge protection device including a first pair of silicon avalanche diodes and providing a second surge protection device including a second pair of silicon avalanche diodes. The first surge protection device is connected on a first connection line between a first terminal of a railroad signaling electronic equipment to be protected from a surge and a first terminal of a first rail of two physical rails. The second surge protection device is connected on a second connection line between a second terminal of the railroad signaling electronic equipment and a second terminal of a second rail of the two physical rails. The first surge protection device and the second surge protection device are connected to an earth ground terminal.

DETAILED DESCRIPTION

To facilitate an understanding of embodiments, principles, and features of the present invention, they are explained hereinafter with reference to implementation in illustrative embodiments. In particular, they are described in the context of an improved solution as a surge suppression circuit for a track circuit's surge protection. A multilayered design of the surge suppression circuit provides desired voltage/current clamping characteristics and the speed of same allow a major change in a primary layer of protection. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the surge suppression circuit according to the present disclosure are described below with reference to FIGS. 1-8 herein. Like reference numerals used in the drawings identify similar or identical elements throughout the several views. The drawings are not necessarily drawn to scale.

Figure 1:
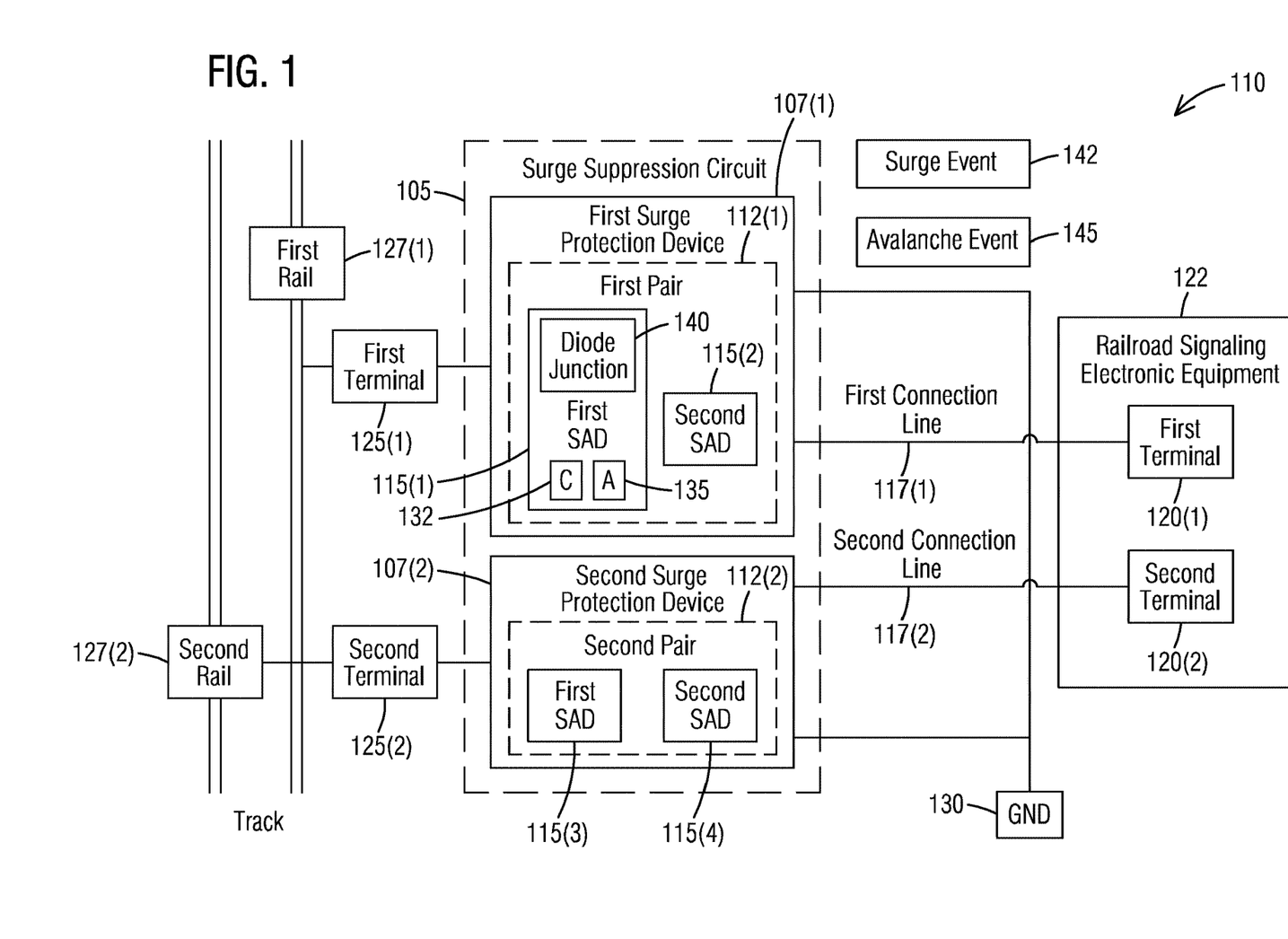
FIG. 1 illustrates a block diagram of a surge suppression circuit including a first surge protection device and a second surge protection device for providing surge protection to a track circuit in accordance with an exemplary embodiment of the present invention.

Consistent with one embodiment of the present invention, FIG. 1 represents a block diagram of a surge suppression circuit 105 including a first surge protection device 107(1) and a second surge protection device 107(2) for providing surge protection to a track circuit 110 in accordance with an exemplary embodiment of the present invention. The surge suppression circuit 105 for the track circuit 110 comprises the first surge protection device 107(1) including a first pair 112(1) of first and second silicon avalanche diodes (SADs) 115(1-2). The surge suppression circuit 105 further comprises the second surge protection device 107(2) including a second pair 112(2) of first and second silicon avalanche diodes (SADs) 115(3-4). A surge protection device (SPD) 107 is a device that attenuates (reduces in magnitude) random, high energy, short duration over voltages caused by lightning, utilities, switching, etc. Such anomalies occur in the form of voltage and current spikes with a duration of less than half an ac voltage cycle. These high energy power spikes can damage railroad electronic equipment. A Surge Protective Device (SPD) 107 or surge suppressors divert high energy power away from a load by providing a lower impedance path to common point earth ground, i.e., a ground terminal (GND) 130.

The first surge protection device 107(1) is connected on a first connection line 117(1) between a first terminal 120(1) of a railroad signaling electronic equipment 122 to be protected from a surge and a first terminal 125(1) of a first rail 127(1) of two physical rails. The second surge protection device 107(1) is connected on a second connection line 117(2) between a second terminal 120(2) of the railroad signaling electronic equipment 122 and a second terminal 125(2) of a second rail 127(2) of the two physical rails. The first surge protection device 107(1) and the second surge protection device 107(2) are connected to the ground terminal (GND) 130.

According to one embodiment, the first surge protection device 107(1) is a multilayered device that stacks the first pair 112(1) of the first and second silicon avalanche diodes (SADs) 115(1-2) together to reach a desired trigger level. Likewise, the second surge protection device 107(2) is a multilayered device that stacks the second pair 112(2) of the first and second silicon avalanche diodes (SADs) 115(3-4) together to reach a desired trigger level. Because of its layered construction, the surge suppression circuit 105 substantially eliminates a risk of a failure mode problem on a track or it minimizes the "Failure Mode" concerns. The layering of the first pair 112(1) of the first and second silicon avalanche diodes (SADs) 115(1-2) or the second pair 112(2) of the first and second silicon avalanche diodes (SADs) 115(3-4) establishes an actual breakdown voltage such that each layer has an avalanche level of about 25 volts yielding a net breakdown voltage of about 200 volts.

The SAD devices 115 are a diode (made from silicon) that is designed to experience avalanche breakdown at a specified reverse bias voltage. The junction of an avalanche diode 115 is designed to prevent current concentration and resulting hot spots, so that the diode 115 is undamaged by the breakdown. The avalanche breakdown is due to minority carriers accelerated enough to create ionization in the crystal lattice, producing more carriers which in turn create more ionization. Because the avalanche breakdown is uniform across the whole junction, the breakdown voltage is nearly constant with changing current when compared to a non-avalanche diode. Avalanche diodes 115 are optimized for avalanche effect, so they exhibit small but significant voltage drop under breakdown conditions. This feature provides better surge protection. Avalanche diodes 115 have a small positive temperature coefficient of voltage.

The SAD devices 115 have an application to protect electronic circuits against damaging high voltages. The avalanche diode 115 is connected to the track circuit 110 so that it is reverse-biased. In other words, its cathode is positive with respect to its anode. In this configuration, the diode 115 is non-conducting and does not interfere with the track circuit 110. If the voltage increases beyond the design limit, the diode 115 goes into avalanche breakdown, causing the harmful voltage to be conducted to ground. When used in this fashion, they are often referred to as clamping diodes or transient voltage suppressors because they fix or "clamp" the maximum voltage to a predetermined level. A clamping voltage, also referred to as peak let through or suppressed voltage rating, is the amount of voltage the surge suppression circuit 105 permits to pass through it to the attached load during a transient event. The clamping voltage is a performance measurement of a surge suppressor's ability to attenuate a transient.

In operation, any failure of a single diode 115 does not directly affect the surge suppression circuit 105 since it triggers a fuse operation within a surge protection device 107 of the first surge protection device 107(1) and the second surge protection device 107(2) which opens the surge suppression circuit 105. The voltage/current clamping characteristics and a speed of operation of the surge suppression circuit 105 enable an enhanced level of a primary layer of protection. The first pair 112(1) of the first and second silicon avalanche diodes (SADs) 115(1-2) or the second pair 112(2) of the first and second silicon avalanche diodes (SADs) 115(3-4) act in concert to provide a voltage clamping action which transfers a surge current from a line 117(1-2) to the earth ground, i.e., the ground terminal (GND) 130. A surge current capacity is the maximum amount of surge current that the surge suppression circuit 105 can pass for a single transient event. This level is used to indicate the protection capacity of a particular surge suppressor design, and when specifying surge suppressors.

Each silicon avalanche diode of the first pair 112(1) of the first and second silicon avalanche diodes (SADs) 115(1-2) or the second pair 112(2) of the first and second silicon avalanche diodes (SADs) 115(3-4) is applied in a reverse bias manner such that a cathode (C) 132 is connected to a line 117(1-2) and an anode (A) 135 is connected to an earth ground, i.e., the ground terminal (GND) 130 and is configured to breakdown at a specific voltage causing a surge current to avalanche conduct to the earth ground, i.e., the ground terminal (GND) 130. An avalanche breakdown results in carriers (electrons) being accelerated across a diode junction 140 causing ionization within a silicon crystal lattice of each silicon avalanche diode 115. During a surge event 142, an avalanche event 145 is uniform across the diode junction 140 which provides a consistent breakdown voltage regardless of a current level.

The "Advanced Silicon Avalanche Diode" Device has a much faster and precise turn on point and shorter dissipation time which better protects Track Circuit Devices such as Grade Crossing Predictors (GCPs). Because the turn on speed and clamping times are so precise one of the typical three surge devices used for, i.e., the track (equalizer) is no longer required. The surge suppression circuit 105 has a lower clamping voltage and a faster dissipation of surge. It provides increased long-term reliability of track circuit equipment, reduced installation costs since fewer devices are required, and less space is required in house.

Less energy is applied to equipment with a two-arrestor device configuration. The "Line to Line" device, the equalizer can be eliminated when using the arrestors using a diode-based technology, i.e., "silicon avalanche diodes (SADs)". This largely eliminates the risk of "Failure Mode" problems on the track but provides a significant cost savings (requires 2 devices vs. 3 today). With this as a bonus less space/wiring is required as well. Within a typical installation the space and cost savings will be significant.

The multilayered construction actually stacks several silicon avalanche diodes 115 together to reach a desired trigger level. Because the design is layered any failure of a single diode 115 does not directly affect the track circuit 110 and in most cases trigger the "fuse operation" within the device (opens the circuit). Silicon Avalanche Diode (SAD) devices 115 show performance on the order of 10 times better than an air gap unit. Voltages were limited to less than 200 volts and time to clamp was less 50 microseconds. More than that, however, is the repeatability of this performance. The SAD devices 115 do not offer varied performance as an air gap device. Air gaps clamping voltage will change (increase) over time due to temperature and moisture content of the air. The voltage will also increase as the metal plates are melted away by surge events. None of these limitations apply to the SAD devices 115. The use of these surge protection devices 107 using "Advanced Silicon Avalanche Diode" technology will greatly improve reliability of track circuit equipment.

Figure 2:
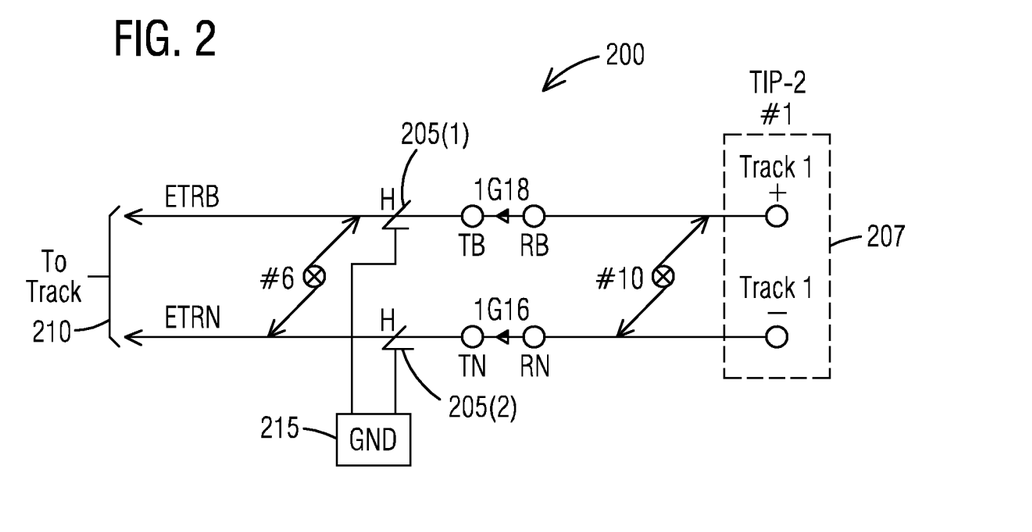
FIG. 2 illustrates a track layout plan including first and second arrestors for surge protection in accordance with an exemplary embodiment of the present invention.

Referring to FIG. 2, it illustrates a track layout plan 200 including first and second arrestors or surge protection devices 205(1-2) for surge protection in accordance with an exemplary embodiment of the present invention. FIG. 2 is a section of an actual railroad signal plan. It shows the connection between an electronic control equipment 207 and two physical rails of a track 210. The rail connections to the track 210 are labeled as "ETRB and ETRN". The symbol #6 is for these lines to indicate the wire size going to the rails. The two symbols labeled "H" are the first and second arrestors 205(1-2) which are applied in this instance per the application. They are connected between the lines ETRB and ETRN and an "earth ground (GND)" 215. To the right of first and second arrestors 205(1-2) are 4 terminals (circles) labeled TB, RB, TN, RN with triangle symbols between a pair of the terminals. These symbols 1G18 and 1G16 are test terminals that allow the line to be opened electrically to allow for testing and measurements. The electronic control equipment 207 to protect is shown on the right side of the figure and labeled "TIP-2 #1. It has 2 track connections labeled as "Track 1+ and Track 1−". The #10 symbol represents the wire size for these connections.

Figure 3:
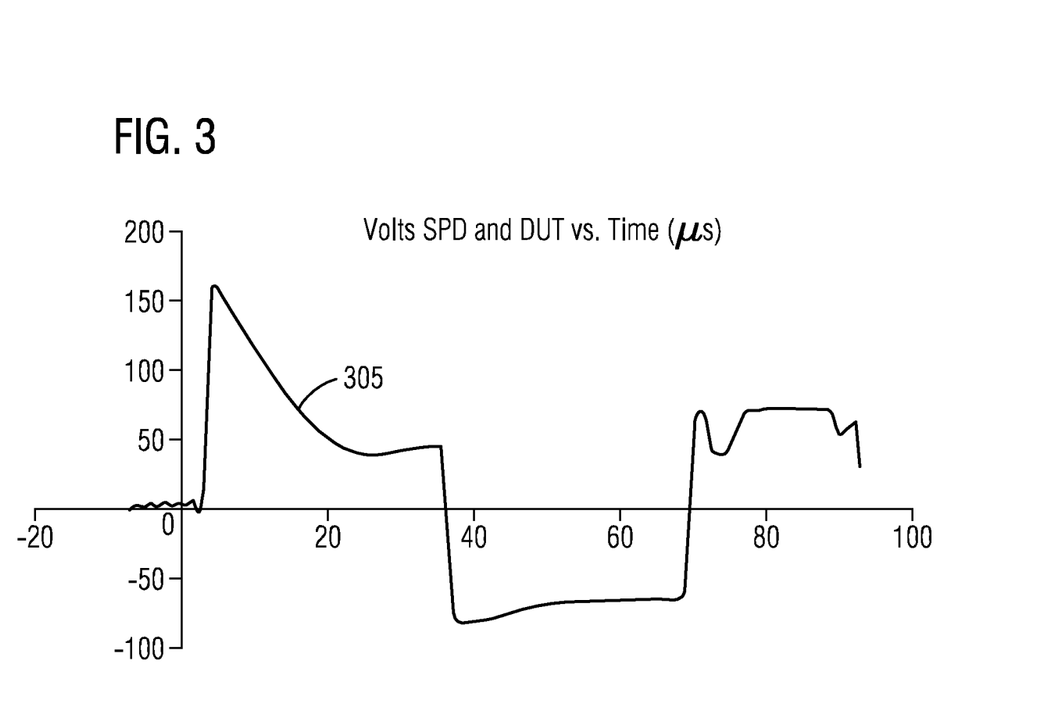
FIG. 3 illustrates a voltage waveform of an application with only two first and second arrestors but without an equalizer in accordance with an exemplary embodiment of the present invention.

Turning now to FIG. 3, it illustrates a voltage waveform 305 of an application with only two first and second arrestors or surge protection devices 205(1-2) of FIG. 2 but without an air gap equalizer in accordance with an exemplary embodiment of the present invention. The air gap equalizer is normally provided a "Line to Line" device between two air gap arrestors such as the first and second arrestors 205(1-2) of FIG. 2. However, the "Line to Line" device, i.e., the equalizer is eliminated when using the two arrestors 205(1-2) using a diode-based technology, i.e., "silicon avalanche diodes (SADs)". This is so because the turn on speed and clamping times are so precise one of the typical three surge devices used for, i.e., the track (equalizer) is no longer required. The voltage waveform 305 shows Vmax=170V, Energy=24 mJ.

Figure 4:
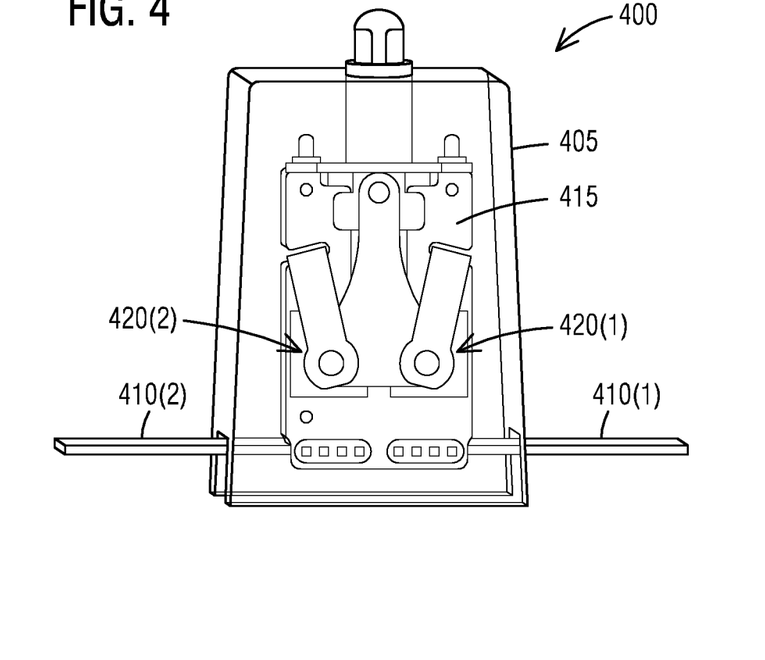
FIG. 4 illustrates a front view of an arrestor in accordance with an exemplary embodiment of the present invention.

FIG. 4 illustrates a front view of an arrestor or a surge protection device 400 in accordance with an exemplary embodiment of the present invention. The arrestor 400 comprises a housing 405 and two metal connectors 410(1-2) coupled to a printed circuit board (PCB) 415 which has first and second surge protection devices 420(1-2) mounted on it.

Figure 5:
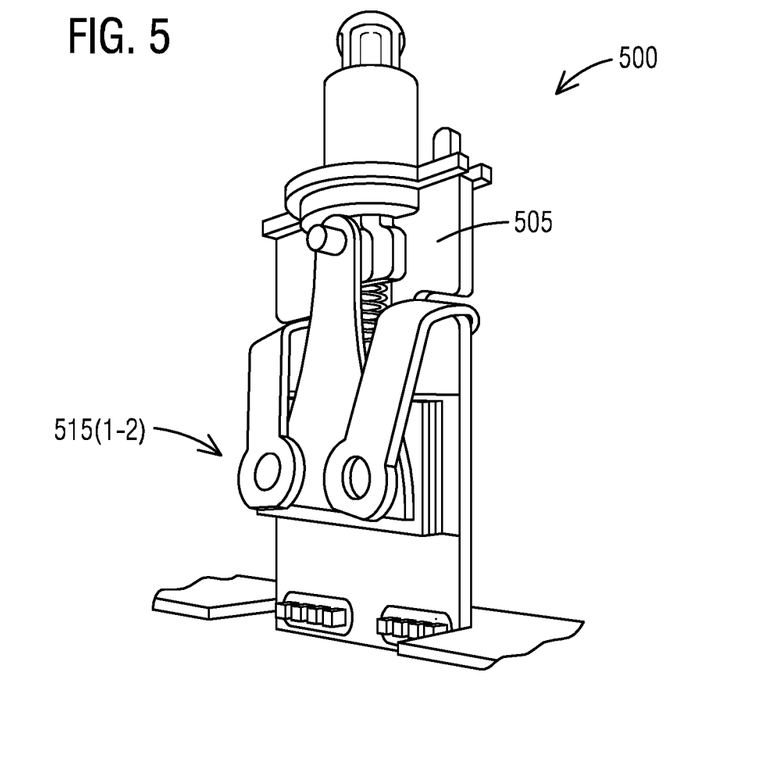
FIG. 5 illustrates a perspective view of an arrestor in accordance with an exemplary embodiment of the present invention.

As seen in FIG. 5, it illustrates a perspective view of an arrestor or a surge protection device 500 in accordance with an exemplary embodiment of the present invention. The arrestor 500 comprises a printed circuit board (PCB) 505 which includes a first pair of first and second silicon avalanche diodes (SADs) 515(1-2).

Figure 6:
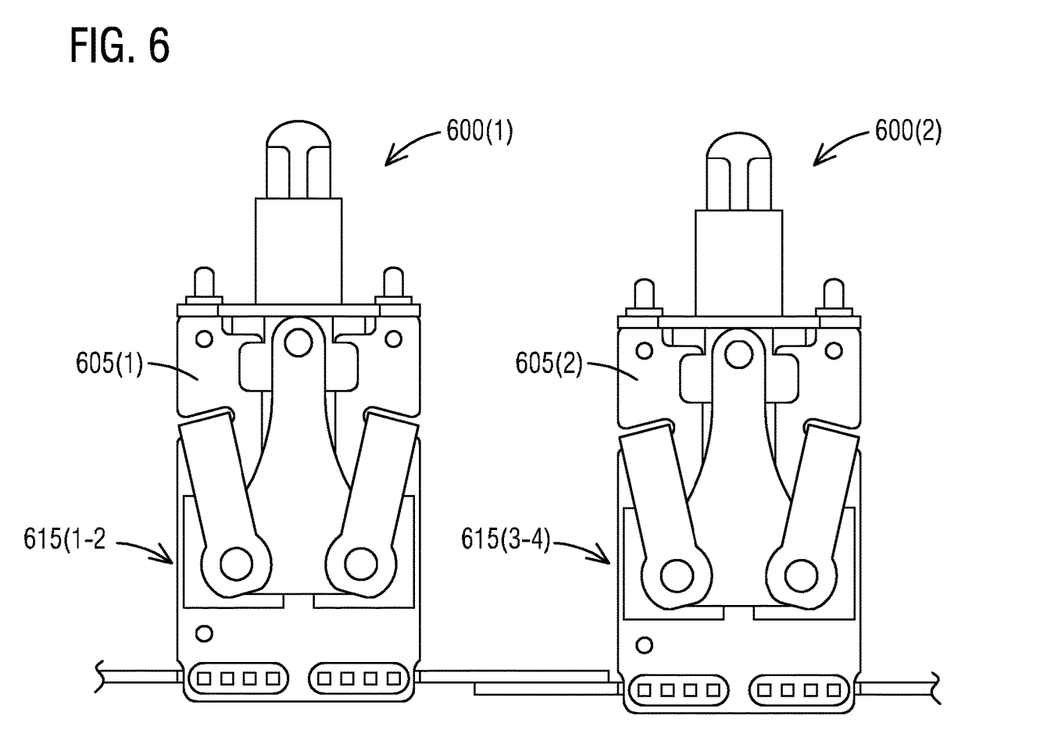
FIG. 6 illustrates a front view of first and second arrestors in accordance with an exemplary embodiment of the present invention.

As shown in FIG. 6, it shows a front view of first and second arrestors or surge protection devices 600(1-2) in accordance with an exemplary embodiment of the present invention. The arrestor 600(1) comprises a printed circuit board (PCB) 605(1) which includes a first pair of first and second silicon avalanche diodes (SADs) 615(1-2). The arrestor 600(2) comprises a printed circuit board (PCB) 605(2) which includes a second pair of first and second silicon avalanche diodes (SADs) 615(3-4).

Figure 7:
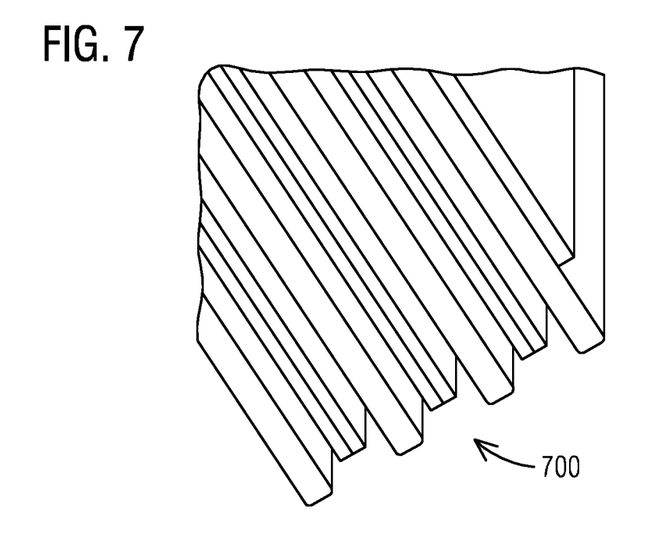
FIG. 7 illustrates a view of silicon avalanche diode layers of a first surge protection device in accordance with an exemplary embodiment of the present invention.

In FIG. 7, it depicts a view of silicon avalanche diode layers 700 of a first surge protection device 705 in accordance with an exemplary embodiment of the present invention. An avalanche diode is a special type of semiconductor device designed to operate in reverse breakdown region. Avalanche diodes are generally made from silicon or other semiconductor materials. The construction of avalanche diode is similar to Zener diode but the doping level in avalanche diode differs from Zener diode. avalanche diodes are lightly doped. Therefore, the width of depletion layer in avalanche diode is very wide compared to the Zener diode. Because of this wide depletion region, reverse breakdown occurs at higher voltages in avalanche diode. The breakdown voltage of avalanche diode is carefully set by controlling the doping level during manufacture.

A normal p-n junction diode allows electric current only in forward direction whereas an avalanche diode allows electric current in both forward and reverse directions. However, avalanche diode is specifically designed to operate in reverse biased condition. Avalanche diode allows electric current in reverse direction when reverse bias voltage exceeds the breakdown voltage. The point or voltage at which electric current increases suddenly is called breakdown voltage.

When the reverse bias voltage applied to the avalanche diode exceeds the breakdown voltage, a junction breakdown occurs. This junction breakdown is called avalanche breakdown. When forward bias voltage is applied to the avalanche diode, it works like a normal p-n junction diode by allowing electric current through it. When reverse bias voltage is applied to the avalanche diode, the free electrons (majority carriers) in the n-type semiconductor and the holes (majority carriers) in the p-type semiconductor are moved away from the junction. As a result, the width of depletion region increases. Therefore, the majority carriers will not carry electric current. However, the minority carriers (free electrons in p-type and holes in n-type) experience a repulsive force from external voltage.

As a result, the minority carriers flow from p-type to n-type and n-type to p-type by carrying the electric current. However, electric current carried by minority carriers is very small. This small electric current carried by minority carriers is called reverse leakage current. If the reverse bias voltage applied to the avalanche diode is further increased, the minority carriers (free electrons or holes) will gain large amount of energy and accelerated to greater velocities. The free electrons moving at high speed will collide with the atoms and transfer their energy to the valence electrons.

The valance electrons which gains enough energy from the high-speed electrons will be detached from the parent atom and become free electrons. These free electrons are again accelerated. When these free electrons again collide with other atoms, they knock off more electrons. Because of this continuous collision with the atoms, a large number of minority carriers (free electrons or holes) are generated. These large numbers of free electrons carry excess current in the diode.

When the reverse voltage applied to the avalanche diode continuously increases, at some point the junction breakdown or avalanche breakdown occurs. At this point, a small increase in voltage will suddenly increases the electric current. This sudden increase of electric current may permanently destroy the normal p-n junction diode. However, avalanche diodes may not be destroyed because they are carefully designed to operate in avalanche breakdown region. The breakdown voltage of the avalanche diode depends on the doping density. Increasing the doping density will decreases the breakdown voltage of the avalanche diode.

Figure 8:
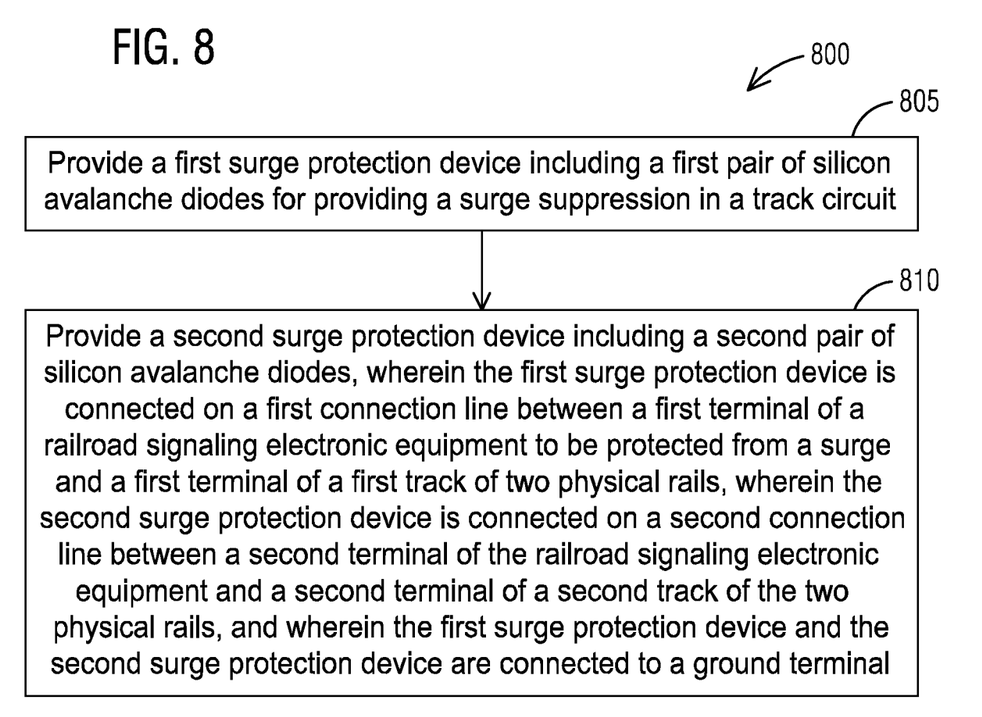
FIG. 8 illustrates a schematic view of a flow chart of a method of providing a surge suppression in a track circuit in accordance with an exemplary embodiment of the present invention.

With regard to FIG. 8, it illustrates a schematic view of a flow chart of a method 800 of providing a surge suppression in the track circuit 110 in accordance with an exemplary embodiment of the present invention. Reference is made to the elements and features described in FIGS. 1-7. It should be appreciated that some steps are not required to be performed in any particular order, and that some steps are optional.

The method 800 in step 805 provides a surge suppression in the track circuit 110 by providing a first surge protection device including a first pair of silicon avalanche diodes. The method 800 in step 810 further provides a second surge protection device including a second pair of silicon avalanche diodes. The first surge protection device is connected on a first connection line between a first terminal of a railroad signaling electronic equipment to be protected from a surge and a first terminal of a first track of two physical rails. The second surge protection device is connected on a second connection line between a second terminal of the railroad signaling electronic equipment and a second terminal of a second track of the two physical rails. The first surge protection device and the second surge protection device are connected to an earth ground terminal.

While a surge protection device including a pair of silicon avalanche diodes is described here a range of one or more other combination or number of diodes are also contemplated by the present invention. For example, other types of surge protection devices may be implemented based on one or more features presented above without deviating from the spirit of the present invention.

The techniques described herein can be particularly useful for silicon avalanche diode (SAD) layers. The key to the present invention is a multilayered construction of a SAD device. A multilayered surge protection device stacks a pair of first and second silicon avalanche diodes (SADs) together. While particular embodiments of a surge protection device are described in terms of layers of two silicon avalanche diodes (SADs), the techniques described herein are not limited to such two-layer design but can also be used with other lattice structures or configurations.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A surge suppression circuit for a track circuit, comprising:
a first surge protection device including a first pair of silicon avalanche diodes; and
a second surge protection device including a second pair of silicon avalanche diodes,
wherein the first surge protection device is connected on a first connection line between a first terminal of a railroad signaling electronic equipment to be protected from a surge and a first terminal of a first rail of two physical rails,
wherein the second surge protection device is connected on a second connection line between a second terminal of the railroad signaling electronic equipment and a second terminal of a second rail of the two physical rails,
wherein the first surge protection device and the second surge protection device are connected to an earth ground terminal, and
wherein layering of the first pair of silicon avalanche diodes or the second pair of silicon avalanche diodes establishes an actual breakdown voltage such that each layer has an avalanche level of about 25 volts yielding a net breakdown voltage of about 200 volts.

2. The surge suppression circuit of claim 1, wherein the first surge protection device is a multilayered device that stacks the first pair of silicon avalanche diodes together to reach a desired trigger level.

3. The surge suppression circuit of claim 2, wherein any failure of a single diode does not directly affect the track circuit since it triggers a fuse operation within a surge protection device of the first surge protection device and the second surge protection device which opens the surge suppression circuit.

4. The surge suppression circuit of claim 1, wherein voltage/current clamping characteristics and a speed of operation of the surge suppression circuit enable an enhanced level of a primary layer of protection.

5. The surge suppression circuit of claim 1, wherein the surge suppression circuit substantially eliminates a risk of a failure mode problem on a track.

6. The surge suppression circuit of claim 1, wherein the first pair of silicon avalanche diodes or the second pair of silicon avalanche diodes act in concert to provide a voltage clamping action which transfers a surge current from a line to an earth ground.

7. The surge suppression circuit of claim 1, wherein each silicon avalanche diode of the first pair of silicon avalanche diodes or the second pair of silicon avalanche diodes is applied in a reverse bias manner such that a cathode is connected to a line and an anode is connected to an earth ground and is configured to breakdown at a specific voltage causing a surge current to avalanche conduct to the earth ground.

8. The surge suppression circuit of claim 7, wherein an avalanche breakdown results in carriers (electrons) being accelerated across a diode junction causing ionization within a silicon crystal lattice of the each silicon avalanche diode.

9. The surge suppression circuit of claim 8, wherein during a surge event an avalanche event is uniform across the diode junction which provides a consistent breakdown voltage regardless of a current level.

10. A method of providing a surge suppression in a track circuit, the method comprising:
providing a first surge protection device including a first pair of silicon avalanche diodes; and
providing a second surge protection device including a second pair of silicon avalanche diodes,
wherein the first surge protection device is connected on a first connection line between a first terminal of a railroad signaling electronic equipment to be protected from a surge and a first terminal of a first rail of two physical rails,
wherein the second surge protection device is connected on a second connection line between a second terminal of the railroad signaling electronic equipment and a second terminal of a second rail of the two physical rails,
wherein the first surge protection device and the second surge protection device are connected to an earth ground terminal, and
wherein layering of the first pair of silicon avalanche diodes or the second pair of silicon avalanche diodes establishes an actual breakdown voltage such that each layer has an avalanche level of about 25 volts yielding a net breakdown voltage of about 200 volts.

11. The method of claim 10, wherein the first surge protection device is a multilayered device that stacks the first pair of silicon avalanche diodes together to reach a desired trigger level.

12. The method of claim 10, wherein any failure of a single diode does not directly affect the track circuit since it triggers a fuse operation within a surge protection device of the first surge protection device and the second surge protection device which opens the surge suppression circuit.

13. The method of claim 10, wherein voltage/current clamping characteristics and a speed of operation of the surge suppression circuit enable an enhanced level of a primary layer of protection.

14. The method of claim 10, wherein the surge suppression circuit substantially eliminates a risk of a failure mode problem on a track.

15. The method of claim 10, wherein the first pair of silicon avalanche diodes or the second pair of silicon avalanche diodes act in concert to provide a voltage clamping action which transfers a surge current from a line to an earth ground.

16. The method of claim 10, wherein each silicon avalanche diode of the first pair of silicon avalanche diodes or the second pair of silicon avalanche diodes is applied in a reverse bias manner such that a cathode is connected to a line and an anode is connected to an earth ground and is configured to breakdown at a specific voltage causing a surge current to avalanche conduct to the earth ground.

17. The method of claim 16, wherein an avalanche breakdown results in carriers (electrons) being accelerated across a diode junction causing ionization within a silicon crystal lattice of the each silicon avalanche diode.

18. The method of claim 17, wherein during a surge event an avalanche event is uniform across the diode junction which provides a consistent breakdown voltage regardless of a current level.

* * * * *